United States Patent
Eckel et al.

(10) Patent No.: US 6,566,428 B1
(45) Date of Patent: May 20, 2003

(54) FLAME-RESISTANT THERMOSTABLE POLYCARBONATE ABS MOULDING MATERIALS

(75) Inventors: Thomas Eckel, Dormagen (DE); Dieter Wittmann, Leverkusen (DE); Michael Zobel, Düsseldorf (DE); Heinrich Alberts, Odenthal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/485,284
(22) PCT Filed: Jul. 29, 1998
(86) PCT No.: PCT/EP99/04733
§ 371 (c)(1),
(2), (4) Date: Feb. 7, 2000
(87) PCT Pub. No.: WO99/07779
PCT Pub. Date: Feb. 18, 1999

(30) Foreign Application Priority Data

Aug. 11, 1997 (DE) .......................................... 197 34 663

(51) Int. Cl.[7] .................................................. C08K 5/52
(52) U.S. Cl. ....................................... 524/127; 524/115
(58) Field of Search ................................. 524/127, 115

(56) References Cited

U.S. PATENT DOCUMENTS 5,205,394 A    4/1993  Zeuschner ................... 198/369
5,627,228 A  * 5/1997  Kobayashi ................... 524/127
5,672,645 A  * 9/1997  Eckel et al. .................. 524/127
5,674,924 A  * 10/1997 Lee et al. ..................... 523/201

FOREIGN PATENT DOCUMENTS

| EP | 640655   | * | 3/1995 |
| EP | 714932   | * | 6/1996 |
| EP | 731140   | * | 9/1996 |
| EP | 761746   | * | 3/1997 |
| EP | 771851   | * | 5/1997 |
| JP | 59193920 | * | 3/1985 |

* cited by examiner

*Primary Examiner*—Cephia D. Toomer
(74) *Attorney, Agent, or Firm*—Joseph C. Gil; Aron Preis

(57) ABSTRACT

A flame-resistant, thermoplastic molding composition characterized by its improved stress cracking resistance, notched impact strength and heat resistance is disclosed. The composition contains A) an aromatic polycarbonate or polyestercarbonate, B) a graft polymer of B.1 5 to 95 wt. % of one or more vinyl monomers on B.2 5 to 95 wt. % of one or more graft substrates with a glass transition temperature below 10° C. and an average particle size ($d_{50}$ value) of 0.05 to 5 μm, C) 0 to 50 parts by weight of a thermoplastic vinyl copolymer, D) 0.5 to 20 parts by weight of at least one phosphorus compound of the general formula (I) and optionally at least one further phosphorus compound which differs from compounds of the formula (I), and E) 0.05 to 5 parts by weight of a fluorinated polyolefin.

13 Claims, No Drawings

FLAME-RESISTANT THERMOSTABLE POLYCARBONATE ABS MOULDING MATERIALS

The present invention relates to polycarbonate/ABS moulding compositions which are rendered flame-resistant with phosphorus compounds and which have outstanding mechanical properties, in particular a high heat-resistance.

EP-A 0 640 655 describes moulding compositions consisting of aromatic polycarbonate, styrene-containing copolymers and graft polymers which can be rendered flame-resistant using monomeric and/or oligomeric phosphorus compounds.

EP-A 0 363 608 describes flame-resistant polymer mixtures consisting of aromatic polycarbonate, styrene-containing copolymer or graft copolymer as well as oligomeric phosphates as flame-resistant additives. For many applications, such as for example moulded articles inside housings, the heat resistance of these mixtures is often not adequate.

The object of the present invention is, therefore, to provide flame-resistant polycarbonate/ABS moulding compositions which have outstanding heat-resistance in addition to the high flame-resistance which is required.

Surprisingly, it has now been found that by using the mono- and/or oligo-phosphorus compounds according to the invention flame-resistant moulding compositions can be obtained which produce moulded items with very good mechanical properties and outstanding heat-resistance.

The present invention therefore provides flame-resistant, thermoplastic moulding compositions containing A 5 to 95, preferably 10 to 90 parts by weight, in particular 20 to 80 parts by weight of aromatic polycarbonate or polyestercarbonate B 1 to 60, preferably 1 to 40 parts by weight, in particular 2 to 30 parts by weight of at least 1 graft polymer of
B.1 5 to 95, preferably 20 to 60 wt. %, of one or more vinyl monomers on
B.2 5 to 95, preferably 40 to 80 wt. % of one or more graft substrates with a glass transition temperature below 10° C., preferably 0° C., in particular <−20° C. and an average particle size ($d_{50}$ value) of 0.05 to 5 $\mu$m, preferably 0.20 to 0.35 $\mu$m, in particular 0.25 to 0.30 $\mu$m.

C 0 to 50, preferably 1 to 30, in particular 2 to 25 parts by weight of a thermoplastic vinyl (co)polymer D 0.5 to 20 parts by weight, preferably 1 to 18 parts by weight, in particular 2 to 15 parts by weight, of at least one phosphorus compound of the general formula (I)

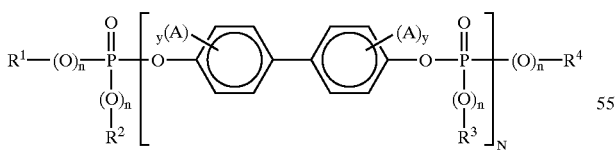

(I)

in which
A independently of each other, represents halogen, preferably chlorine and/or bromine, a $C_1$–$C_8$ alkyl, preferably $C_1$–$C_4$ alkyl, in particular methyl, $C_6$–$C_{10}$ aryl, preferably phenyl, or $C_7$–$C_{12}$ aralkyl, preferably phenyl—$C_1$–$C_4$ alkyl, in particular benzyl, group,
$R^1$, $R^2$, $R^3$ and $R^4$, independently of each other, represent an optionally halogenated $C_1$–$C_8$ alkyl group, or a $C_5$–$C_6$ cycloalkyl, $C_6$–$C_{20}$ aryl, or $C_7$–$C_{12}$ aralkyl group, each optionally substituted by halogen and/or a $C_1$–$C_4$ alkyl group,
y each, independently, is 0, 1, 2, 3 or 4,
n each, independently, is 0 or 1, preferably 1,
N is 0.3 to 30
and optionally further phosphorus compound(s) of the following formula (II)

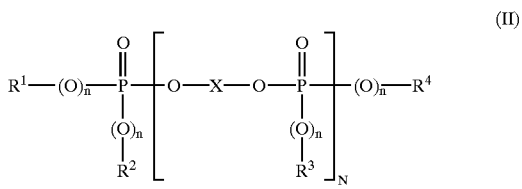

(II)

in which the groups $R^1$, $R^2$, $R^3$, $R^4$, n and N are defined as above and
x represents a mononuclear or polynuclear aromatic group with 6 to 30 carbon atoms, with the exception of diphenyl,
E 0.05 to 5 parts by weight, preferably 0.1 to 1 part by weight, in particular 0.1 to 0.5 parts by weight of a fluorinated polyolefin,
wherein the sum of the parts by weight of all the components A+B+C+D+E is 100.

Component A

Aromatic polycarbonates and/or aromatic polyestercarbonates in accordance with component A which are suitable according to the invention are known from the literature or can be prepared by processes known from the literature (to prepare aromatic polycarbonates see for example Schnell "Chemistry and Physics of Polycarbonates" Interscience Publishers 1964 as well as DE-AS 1 495 626, DE-OS 2 232 877, DE-OS 2 703 376, DE-OS 2 714 544, DE-OS 3 000 610, DE-OS 3 832 396; and to prepare aromatic polyestercarbonates, e.g. DE-OS 3 077 934).

Aromatic polycarbonates are prepared e.g. by reacting diphenols with carbonic acid halides, preferably phosgene, and/or with aromatic dicarboxylic acid dihalides, preferably benzene dicarboxylic acid dihalides, by the phase interface process, optionally using chain terminators, for example monophenols, and optionally using trifunctional or more than trifunctional branching agents, for example triphenols or tetraphenols.

Diphenols for preparing aromatic polycarbonates and/or aromatic polyestercarbonates are preferably those of the formula (III)

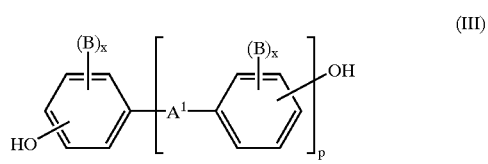

(III)

wherein
$A^1$ represents a single bond, a $C_1$–$C_5$ alkylene, $C_2$–$C_5$ alkylidene, $C_5$–$C_6$ cycloalkylidene, —O—, —SO—, —CO—, —S—, —SO$_2$— or $C_6$–$C_{12}$ arylene group, which may be fused to further aromatic rings which may optionally contain heteroatoms, or a group of the formula

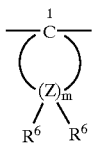

or a group of the formula (V)

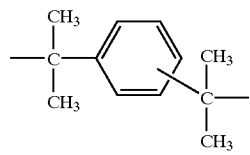

B independently of each other, represents a $C_1$–$C_8$ alkyl, preferably $C_1$–$C_4$ alkyl, in particular methyl, halogen, preferably chlorine and/or bromine, $C_6$–$C_{10}$ aryl, preferably phenyl, $C_7$–$C_{12}$ aralkyl, or phenyl-$C_1$–$C_4$ alkyl, preferably benzyl, group, x each, independently, is 0, 1 or 2, p is 1 or 0 and $R^5$ and $R^6$ can be individually chosen for each Z, and independently of each other, represent hydrogen or a $C_1$–$C_6$ alkyl group, preferably hydrogen, methyl and/or ethyl, Z is carbon, and m is an integer, from 4 to 7, preferably 4 or 5, with the proviso that $R^5$ and $R^6$ are both alkyl groups on at least one Z atom.

Preferred diphenols are hydroquinone, resorcinol, 4,4-dihydroxydiphenyl, bis-(hydroxyphenyl)-$C_1$–$C_5$-alkanes, bis-(hydroxyphenyl)-$C_5$–$C_6$-cycloalkanes, bis-(hydroxyphenyl)-ethers, bis-(hydroxyphenyl)-sulfoxides, bis-(hydroxyphenyl)-ketones, bis-(hydroxyphenyl)-sulfones, α,α-bis-(hydroxyphenyl)-diisopropyl-benzenes such as their ring-brominated and/or ring-chlorinated derivatives.

Particularly preferred diphenols are 4,4-diphenylohenol, bisphenol-A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl-sulfone and their di- and tetrabrominated or chlorinated derivatives such as, for example, 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane.

2,2-bis-(4-hydroxyphenyl)-propane (bisphenol-A) is particularly preferred.

The diphenols may be used individually or as any mixtures.

The diphenols are known from the literature or can be obtained using processes known from the literature.

Suitable chain terminators for preparing thermoplastic aromatic polycarbonates are, for example, phenol, p-chlorophenol, p-tert-butylphenol, or 2,4,6-tribromophenol, but also long chain alkylphenols such as 4-(1,3-tetramethylbutyl)-phenol, in accordance with DE-OS 2 842 005 or monoalkylphenols or dialkylphenols with a total of 8 to 20 carbon atoms in the alkyl substituents, such as 3,5-di-tert-butylphenol, p-iso-octylphenyl, p-tert-octylphenol, p-dodecylphenol and 2-(3,5-dimethylheptyl)-phenol and 4-(3,5-dimethylheptyl)-phenol. The amount of chain terminators to be used is generally between 0.5 and 10 mol. %, with respect to the molar sum of the particular diphenols used.

The thermoplastic aromatic polycarbonates have average weight-averaged molecular weights ($M_w$, determined e.g. by ultracentrifuge or light scattering measurements) of 10,000 to 200,000, preferably 20,000 to 80,000.

The thermoplastic aromatic polycarbonates may be branched in a known manner, in fact by the incorporation of 0.05 to 2.0 mol. %, with respect to the sum of diphenols used, of trifunctional or more than trifunctional compounds, for example those with three or more than three phenolic groups.

Homopolycarbonates or copolycarbonates are suitable. To prepare copolycarbonates according to the invention as component A, 1 to 25 wt. %, preferably 2.5 to 25 wt. % (with respect to the total amount of diphenols being used), of polydiorganosiloxanes with hydroxy-aryloxy terminal groups may also be used. These are known (see for example U.S. Pat. No. 3,419,634) or can be prepared using processes known from the literature. The preparation of polydiorganosiloxane-containing copolycarbonates is described e.g. in DE-OS 3 334 782.

Preferred polycarbonates, in addition to bisphenol-A homopolycarbonates, are copolycarbonates of bisphenol-A with up to 15 mol. %, with respect to the molar sum of diphenols, other than the diphenols mentioned elsewhere as preferred or particularly preferred compounds, in particular 2,2-bis-(3,5-dibromo-4-hydroxyphenyl)-propane.

Aromatic dicarboxylic acid dihalides for preparing aromatic polyestercarbonates are preferably diacid dichlorides of isophthalic acid, terephthalic acid, diphenylether-4,4'-dicarboxylic acid and naphthalene-2,6-dicarboxylic acid.

Mixtures of the diacid dichlorides of isophthalic acid and terephthalic acid in the ratio between 1:20 and 20:1 are particularly preferred.

When preparing polyestercarbonates a carbonic acid halide, preferably phosgene, may also be used as a bifunctional acid derivative.

Suitable chain terminators for preparing aromatic polyestercarbonates, in addition to the monophenols already mentioned, are their chlorinated carbonates and the acid chlorides of aromatic monocarboxylic acids, which may optionally be substituted by $C_1$–$C_{22}$ alkyl groups or by halogen atoms and also aliphatic $C_2$–$C_{22}$ mono-carboxylic acid chlorides.

The amount of chain terminators is 0.1 to 10 mol. %, with respect to the moles of diphenols in the case of phenolic chain terminators or with respect to the moles of dicarboxylic acid dichlorides in the case of monocarboxylic acid chloride chain terminators.

Aromatic hydroxycarboxylic acids may also be incorporated into the aromatic polyestercarbonates.

The aromatic polyestercarbonates may be either linear or branched in a known manner (see also DE-OS 2 940 024 and DE-OS 3 007 934).

As branching agents, the following may be used in the amounts stated: trifunctional or more than trifunctional carboxylic acid chlorides such as trimesic trichloride, cyanuric acid trichloride, 3,3-4,4-benzophenonetetracarboxylic acid tetrachloride, 1,4,5,8-naphthalenetetracarboxylic acid tetrachloride or pyromellitic acid tetrachloride 0.01 to 1.0 mol. % (with respect to the dicarboxylic acid dichlorides used) or trifunctional or more than trifunctional phenols such as phloroglucine, 4,6-dimethyl-2,4,6-tri-(4-hydroxyphenyl)-hept-2-ene, 4,4-dimethyl-2,4,6-tri-(4-hydroxyphenyl)-heptane, 1,3,5-tri-(4-hydroxyphenyl)- benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, tetra-(4-hydroxyphenyl)-methane, 2,6-bis-(2-hydroxy-5-methylbenzyl)-4-methylphenol, 2-(4-hydroxyphenyl)-2-(2,4-dihydroxyphenyl)-propane, tetra-(4-[4-hydroxyphenyl-isopropyl]-phenoxy)-methane, 1,4-bis-[(4,4-dihydroxytriphenyl)-methyl]-benzene in amounts of 0.01 to 1.0 mol. %, with respect to the diphenols used. Phenolic branching agents may be initially introduced with the diphenols; acid chloride branching agents may be introduced together with the acid dichlorides.

The proportion of carbonate structural units in the thermoplastic aromatic polyestercarbonates may have any value at all.

The proportion of carbonate groups is preferably up to 100 mol. %, in particular up to 80 mol. %, especially up to 50 mol. %, with respect to the sum of ester groups and carbonate groups.

The ester and carbonate fractions in the aromatic polyestercarbonates may be present in the form of blocks or randomly distributed in the polycondensate.

The relative solution viscosity ($\eta_{rel}$) of the aromatic polyestercarbonates is in the range 1.18 to 1.4, preferably 1.22 to 1.3 (measured in solutions of 0.5 g of polyestercarbonate in 100 ml of methylene chloride solution at 25° C.).

The thermoplastic aromatic polycarbonates and polyestercarbonates may be used individually or in any mixture with each other.

Component B

Component B in accordance with the invention is a graft polymer. These include graft copolymers with rubber-elastic properties which are substantially obtainable from at least two of the following monomers: chloroprene, 1,3-butadiene, isoprene, styrene, acrylonitrile, ethylene, propylene, vinyl acetate and (meth)acrylates with 1 to 18 carbon atoms in the alcohol component; that is polymers such as are described e.g. in "Methoden der Organischen Chemie" (Houben-Weyl), Volume 14/1, Georg Thieme-Verlag, Stuttgart 1961, pages 393–406 and in C. B. Bucknall "Toughened Plastics", Appl. Science Publishers, London 1977. Preferred polymers B are partially cross-linked and have gel contents of more than 20 wt. %, preferably more than 40 wt. %, in particular more than 60 wt. %.

Preferred graft polymers B are graft polymers of:
B.1 5 to 95, preferably 30 to 80, parts by weight of a mixture of
  B.1.1 50 to 99 parts by weight of styrene, α-methylstyrene, halogen or methyl ring-substituted styrenes, methyl methacrylate or mixtures of these compounds and
  B.1.2 1 to 50 parts by weight of acrylonitrile, methacrylonitrile, methyl methacrylate, maleic anhydride, $C_1$–$C_4$ alkyl- or phenyl-N-substituted maleic imides or mixtures of these compounds on
B.2 5 to 95, preferably 20 to 70, parts by weight of a polymer based on diene and/or alkyl acrylates with a glass transition temperature below −10° C.

Preferred graft polymers B are e.g. substrates B.2 such as polybutadienes, butadiene/styrene copolymers and acrylate rubbers grafted with styrene and/or acrylonitrile and/or alkyl (meth)acrylates, i.e. copolymers of the type described in DE-OS 1 694 173 (=U.S. Pat. No. 3,564,077); or polybutadienes, butadiene/styrene or butadiene/acrylonitrile copolymers, polyisobutenes or polyisoprenes grafted with alkyl acrylates or alkyl methacrylates, vinyl acetate, acrylonitrile, styrene and/or alkylstyrenes, such as are described e.g. in DE-OS 2 348 377 (=U.S. Pat. No. 3,919, 353).

Particularly preferred polymers B are e.g. ABS polymers such as are described e.g. in DE-OS 2 035 390 (=U.S. Pat. No. 3,644,574) or in DE-OS 2 248 242 (=GB-PS 1 409 275).

Particularly preferred graft polymers B are obtainable by a grafting reaction of
  α 10 to 70, preferably 15 to 50, in particular 20 to 40 wt. %, with respect to the graft polymer B, of at least one (meth)acrylate or 10 to 70, preferably 15 to 50, in particular 20 to 40 wt. %, of a mixture of 10 to 50, preferably 20to 35 wt. %, with respect to the mixture, of acrylonitrile or (meth)acrylate and 50 to 90, preferably 65 to 80 wt. %, with respect to the mixture, of styrene, as applied graft B.1, on
  30 to 90, preferably 50 to 85, in particular 60 to 80 wt. %, with respect to graft polymer B, of a butadiene polymer with at least 50 wt. %, with respect to β, of butadiene groups, as graft substrate B.2,
    wherein the gel fraction of graft substrate P is preferably at least 70 wt. % (measured in toluene), the degree of grafting G is 0.15 to 0.55 and the average particle diameter $d_{50}$ of the graft polymer B.2 is 0.05 to 2 μm, preferably 0.1 to 0.6 μm.

(Meth)acrylates α are esters of acrylic acid or methacrylic acid with monohydric alcohols with 1 to 18 carbon atoms. Methyl, ethyl and propyl methacrylate, n-butyl acrylate, t-butyl acrylate and t-butyl methacrylate are particularly preferred.

Graft substrate β may contain, in addition to butadiene groups, up to 50 wt. %, with respect to β, of groups from other ethylenically unsaturated monomers such as styrene, acrylonitrile, esters of acrylic or methacrylic acid with 1 to 4 carbon atoms in the alcohol components (such as methyl acrylate, ethyl acrylate, methyl methacrylate, ethyl methacrylate), vinyl esters and/or vinyl ethers. The preferred graft substrate β consists of pure polybutadiene.

The degree of grafting G is the ratio by weight of grafted monomers to graft substrate and is dimensionless.

The average particle size $d_{50}$ is the diameter above and below which 50 wt. % of the particle diameters are located. It may be determined by means of ultracentrifuge measurements (W. Scholtan, H. Lange, Kolloid, Z. und Z. Polymere 250 (1972) 782–796).

Particularly preferred polymers B are also e.g. graft polymers of
  τ 20 to 90 wt. %, with respect to component B, of acrylate rubber with a glass transition temperature below −20° C. as graft substrate B.2 and
  δ 10 to 80 wt. %, with respect to component B, of at least one polymerisable ethylenically unsaturated monomer as graft monomer C.1.

Acrylate rubbers τ in polymers B are preferably polymers of alkyl acrylates, optionally with up to 40 wt. % with respect to τ, of other polymerisable ethylenically unsaturated monomers. Preferred polymerisable acrylates include $C_1$–$C_8$ alkyl esters, for example methyl, ethyl, butyl, n-octyl and 2-ethylhexyl esters; halogenated alkyl esters, preferably halogenated $C_1$–$C_8$ alkyl esters such as chloroethyl acrylate, and mixtures of these monomers.

In order to cross-link the product, monomers with more than one polymerisable double bond may be copolymerised. Preferred examples of cross-linking monomers are esters of unsaturated monocarboxylic acids with 3 to 8 carbon atoms and unsaturated monohydric alcohols with 3 to 12 carbon atoms or saturated polyols with 2 to 4 OH groups and 2 to 20 carbon atoms such as, for example, ethyleneglycol dimethacrylate, allyl methacrylate; polyunsaturated heterocyclic compounds such as, for example, trivinyl and triallyl cyanurate; polyfunctional vinyl compounds such as divinyl- and trivinylbenzene; but also triallyl phosphate and diallyl phthalate.

Preferred cross-linking monomers are allyl methacrylate, ethyleneglycol dimethylacrylate, diallyl phthalate and heterocyclic compounds which contain at least 3 ethylenically unsaturated groups.

Particularly preferred cross-linking monomers are the cyclic monomers triallyl cyanurate, triallyl isocyanurate, trivinyl cyanurate, triacryloylhexahydro-s-triazine, triallylbenzenes.

The amount of cross-linking monomers is preferably 0.02 to 5, in particular 0.05 to 2 wt. %, with respect to graft substrate τ.

In the case of cyclic cross-linking monomers with at least 3 ethylenically unsaturated groups, it is advantageous to restrict the amount to less than 1 wt. % of the graft substrate τ.

Preferred "other" polymerisable ethylenically unsaturated monomers, apart from acrylates, which may optionally be used to prepare graft substrates τ are e.g. acrylonitrile, styrene, (x-methylstyrene, acrylaride, vinyl $C_1$–$C_6$ alkyl ethers, methyl methacrylate, butadiene. Preferred acrylate rubbers for use as graft substrates τ are emulsion polymers which have a gel content of at least 60 wt. %.

Further suitable graft substrates in accordance with B.2 are silicone rubbers with graft-active sites such as are described in DE-OS 3 704 657, DE-OS 3 704 655, DE-OS 3 631 540 and DE-OS 3 631 539.

The gel content of graft substrate B.2 is determined at 25° C. in dimethylformamide (M. Hoffmann, H. Krömer, R. Kuhn, Polymeranalytik I and II, Georg Thieme-Verlag, Stuttgart 1977).

Graft polymer B may be prepared by known processes such as bulk, suspension, emulsion or bulk-suspension processes.

Since, as is known, the grafting monomers cannot be grafted onto the grafting substrate completely and absolutely during the grafting reaction, graft polymers B according to the invention are also understood to be those products which are obtained by the polymerisation of graft monomers in the presence of the graft substrate.

The average particle size $d_{50}$ is the diameter above and below which 50% of the particle diameters are located. It may be determined by means of ultracentrifuge measurements (W. Scholtan, H. Lange, Kolloid, Z. und Z. Polymere 250 (1972) 782–1796).

Since, as is known, the grafting monomers cannot be grafted onto the grafting substrate completely and absolutely during the grafting reaction, graft polymers B according to the invention are also understood to be those products which are obtained by the (co)polymerisation of graft monomers in the presence of the graft substrate and which are also present after any working-up procedures.

Component C

Component C comprises at least one thermoplastic vinyl (co)polymer.

Polymers which are suitable for use as (co)polymers C are those made from at least one monomer from the group of vinyl aromatic compounds, vinyl cyanides such as unsaturated nitrites, $C_1$–$C_8$-alkyl (meth)acrylates, unsaturated carboxylic acids and derivatives such as anhydrides and imides of unsaturated carboxylic acids.

(Co)polymers made from

C.1 50 to 99 parts by weight of vinyl aromatic compounds and/or ring-substituted vinyl aromatic compounds, such as, for example, styrene, α-methylstyrene, p-methylstyrene, p-chlorostyrene and/or ($C_1$–$C_4$)-alkyl methacrylates such as e.g. methyl methacrylate, ethyl methacrylate, and C.2 1 to 50 parts by weight of vinyl cyanides such as unsaturated nitrites, for example acrylonitrile and methacrylonitrile and/or ($C_1$–$C_8$)-alkyl (meth)acrylates, e.g. methyl methacrylate, n-butyl acrylate, t-butyl acrylate and/or unsaturated carboxylic acids such as maleic acid and/or derivatives such as anhydrides and imides of unsaturated carboxylic acids, such as for example maleic anhydride and N-phenylmaleic imide, are particularly suitable.

The (co)polymers C are resinous, thermoplastic and rubber-free.

Copolymers of C.1 styrene and C.2 acrylonitrile are particularly preferred.

(Co)polymers in accordance with C are known and can be prepared by radical poly-merisation, in particular by emulsion, suspension, solution or bulk polymerisation. (Co) polymers in accordance with component C preferably have molecular weights $M_w$ (weight average, determined by light scattering or sedimentation) of between 15,000 and 200,000.

(Co)polymers in accordance with component C frequently arise as by-products during the graft polymerisation of component B, in particular if large amounts of monomers B.1 are grafted onto small amounts of rubber B.2. The amount of C optionally also used according to the invention does not include these by-products from the graft polymerisation of B.

If component C is present in the moulding compositions, then the ratio by weight of components B to C is between 2:1 and 1:4, preferably between 1:1 and 1:2, in order to achieve the desired mechanical properties for specific purposes.

Component D

Moulding compositions according to the invention contain, as flame-resistant agents, at least one organic phosphorus compound of the formula (I).

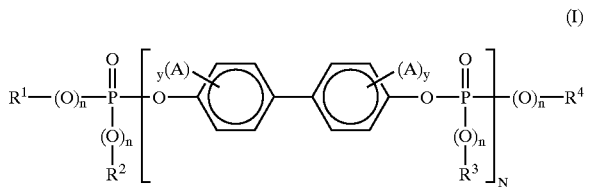

In the formula, the groups $R^1$, $R^2$, $R^3$, $R^4$ and A as well as n and y are defined in the same way as given above. The aromatic groups $R^1$, $R^2$, $R^3$ and $R^4$ and A for their part may be substituted by halogen and/or alkyl groups, preferably chlorine, bromine and/or $C_1$–$C_4$ alkyl groups. Particularly preferred aryl groups are cresyl, phenyl, xylenyl, propylphenyl or butylphenyl and the corresponding brominated and chlorinated derivatives thereof.

N may have a value from 0.3 to 30, preferably an average value of 0.3 to 20, particularly preferably 0.5 to 10, most preferably 0.5 to 6. When mixtures of phosphorus compounds are present, N may have the average values given above. Monophosphorus compounds and/or oligomeric phosphorus compounds may be contained in this mixture. In the event that N=0, formula (I) describes monophosphorus compounds.

Some of compound D may be replaced (at most 75 wt. %) by at least one mono- and/or oligo- and/or polyphosphorus compound of the formula (II), which differs from compounds of the formula (I)

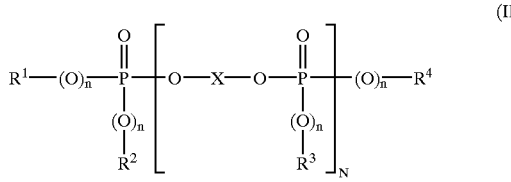

(II)

and in which the groups $R^1$, $R^2$, $R^3$, $R^4$, n and N are defined in the same way as above and X in formula (II) represents a mononuclear or polynuclear aromatic group with 6 to 30 carbon atoms, with the exception of diphenyl. The group is derived from diphenols in accordance with formula (III) such as e.g. bisphenol-A, resorcinol or hydroquinone or their chlorinated or brominated derivatives.

Mixtures of phosphorus compounds of the formula (I), preferably mono- and/or oligomeric phosphates of the formula (1), with N values of 0.5 to 10, in particular 0.5 to 6, are preferably used as component D.

Monomeric and oligomeric phosphorus compounds of the formula (I) in the mixture are preferably chosen so that a synergistic effect is produced. The mixture generally consists of 10 to 90 wt. % of oligomers and 90 to 10 wt. % of monophosphorus compounds of the formula (I). Monomeric phosphorus compounds and/or monophosphate compounds are preferably mixed within the range from 12 to 50, preferably 14 to 40, in particular 15 to 40 wt. %, with the complementary amount of oligomeric phosphate compounds.

Suitable monophosphorus compounds, i.e. N=0, are tributylphosphate, tris-(2-chloroethyl) phosphate, tris-(2,3-dibromopropyl) phosphate, triphenyl phosphate, tricresyl phosphate, diphenylcresyl phosphate, diphenyloctyl phosphate, diphenyl-2-ethylcresyl phosphate, tri-(isopropylphenyl) phosphate, halogen substituted aryl phosphates, dimethyl methylphosphonate, diphenyl methylphosphonate, diethyl phenylphosphonate, triphenylphosphine oxide and/or tricresylphosphine oxides.

Phosphorus compounds in accordance with component D are generally known organic compounds or can be prepared by known methods in an analogous manner (see e.g. Ullmanns Encyklopädie der technischen Chemie, Vol. 18, page 301 et seq 179; Houben-Weyl, Methoden der organischen Chemie, Vol. 12/1, p. 43; Beistein Vol. 6, p. 177).

Component E

Fluorinated polyolefins E are high molecular weight compounds and have glass transition temperatures above −30° C., generally above 100° C., fluorine contents of preferably 65 to 76, in particular 70 to 76 wt. %, average particle diameters $d_{50}$ of 0.05 to 1000, preferably to 0.08 to 20 μm. In general, the fluorinated polyolefins E have a density of 1.2 to 2.3 g/cm³. Preferred fluorinated polyolefins E are polytetrafluoroethylene, polyvinylidene fluoride, tetrafluoroethylene/ hexafluoropropylene copolymers and ethylene/tetrafluoroethylene copolymers. Fluorinated polyolefins are known (see "Vinyl and Related Polymers" by Schildknecht, John Wiley & Sons, Inc., New York, 1962, pp 484–494; "Fluoropolymers" by Wall, Wiley-Interscience, John Wiley & Sons Inc., New York, Vol. 13, 1970, pp 623–654; "Modern Plastics Encyclopedia" 1970 to 1971, Vol. 47, No. 10A, October 1970, McGraw-Hill, Inc., New York, pp 134 and 774; "Modem Plastics Encyclopedia" 1975 to 1976, October 1975, Vol. 52, No. 10A, McGraw-Hill, Inc., New York, pp 27, 28 and 472 and U.S. Pat. Nos. 3,671,487, 3 723 373 and 3,838,092).

They can be prepared by known processes, for example by polymerisation of tetrafluoroethylene in aqueous medium with a free radical-forming catalyst, for example sodium, potassium or ammonium peroxydisulfate at pressures of 7 to 71 kg/cm² and at temperatures of 0 to 200° C., preferably at temperatures of 20 to 100° C. (See e.g. U.S. Pat. No. 2,393,967 for more details). Depending on the form actually used, the density of these materials may be between 1.2 and 2.3 g/cm³ and the average particle size between 0.5 and 1000 μm.

Preferred fluorinated polyolefins E according to the invention are tetrafluoroethylene polymers and have average particle diameters of 0.05 to 20 μm, preferably 0.08 to 10 μm, and a density of 1.2 to 1.9 g/cm³ and are preferably used in the form of a coagulated mixture of emulsions of tetrafluoroethylene polymers E with emulsions of graft polymers B.

Suitable fluorinated polyolefins E which can be used in a powder form are tetrafluoroethylene polymers with average particle diameters of 100 to 1000 μm and densities of 2.0 g/cm³ to 2.3 g/cm³.

To prepare a coagulated mixture of B and E, an aqueous emulsion (latex) of a graft polymer B is first mixed with a finely divided emulsion of a fluorinated polyolefin E; suitable emulsions of fluorinated polyolefin generally have solids contents of 30 to 70 wt. %, preferably 50 to 60 wt. %, in particular 30 to 35 wt. %.

The data given on amounts in the description of component B does not include the proportion of graft polymer in the coagulated mixture of graft polymer and fluorinated polyolefins.

In the emulsion mixture, the ratio by weight of graft polymer B to fluorinated polyolefin E is 95:5 to 60:40. The emulsion mixture is coagulated in a known manner, for example by spray drying, freeze drying or coagulating by adding inorganic or organic salts, acids, bases or organic water-miscible solvents such as alcohols or ketones, preferably at temperatures of 20 to 150° C. in particular 50 to 100° C. If required drying may be performed at 50 to 200° C., preferably 70 to 100° C.

Suitable tetrafluoroethylene polymer emulsions are commercially available products and are provided for example by Du Pont as Teflon 30 N.

Moulding compositions according to the invention may contain at least one of the conventional additives such as lubricants, mould release agents, nucleating agents, antistatic agents, stabilisers and dyes, pigments and/or reinforcing materials. Suitable inorganic reinforcing materials are glass fibres, optionally cut up or milled, glass beads, glass spheres, reinforcing materials in the form of platelets such as kaolin, talc, mica, carbon fibres. Cut up or milled glass fibres are preferred as reinforcing materials, preferably with a length of 1 to 10 mm and a diameter of less than 20 μm, in an amount of 1 to 40 parts by weight; the glass fibres are preferably surface-treated.

Moulding compositions according to the invention may also contain at least one polar compound of at least one metal from groups 1A to 5A and 1B to 8 of the periodic system with at least one element chosen from the group oxygen, sulfur, boron, carbon, phosphorus, nitrogen, hydrogen and silicon, as very finely divided inorganic powders. An oxide or hydroxide, preferably $TiO_2$, $SiO_2$, $SnO_2$, ZnO, boehmite, $ZrO_2$, $Al_2O_3$, iron oxides, their mixtures and doped compounds are preferably used as a polar compound, in particular boehmite or $TiO_2$, with an average particle diameter of less than 200 nm, preferably 0.1 to 100 nm, in particular 1 to 50 nm.

Moulding compositions according to the invention may contain one or more further optionally synergistic flame-resistant agents. The following may be mentioned by way of example as further flame-resistant agents: organic halogen compounds such as decabromobisphenylether, tetrabromobisphenol, inorganic halogen compounds such as ammonium bromide, nitrogen compounds such as melamine, melamine-formaldehyde resins, inorganic hydroxide compounds such a Mg or Al hydroxide, inorganic compounds such as antimony oxides, barium metaborate, hydroxy-antimonate, zirconium oxide, zirconium hydroxide, molybdenum oxide, ammonium molybdate, zinc borate, ammonium borate and tin oxide as well as siloxane compounds. These flame-resistant agents are generally added in amounts of 0.01 to 35 wt. % (with respect to the total moulding composition).

Moulding compositions according to the invention containing components A to E and optionally other known additives such as stabilisers, dyes, pigments, lubricants and mould release agents, nucleating agents, nano-particles and anti-static agents and reinforcing materials and flame-resistant agents are prepared by mixing the particular constituents in a known manner and melt-compounding or melt-extruding at temperatures of 200° C. to 300° C. in conventional equipment such as internal compounders, extruders and twin shaft screws, wherein component E is preferably used in the form of the coagulated mixture mentioned above.

Mixing the individual constituents may be performed in a known manner, either in sequence or simultaneously, in fact either at about 20° C. (room temperature) or at a higher temperature.

Moulding compositions according to the present invention may be used to produce moulded items of any type. Moulded items may be produced in particular by injection moulding. Examples of moulded items which may be prepared are: housing parts of any type, e.g. for domestic equipment such as juice extractors, coffee machines, mixers, for office machines such as monitors, printers or copiers, or cladding sheets for the building sector and parts for the automobile sector. They may also be used in the area of electrical engineering because they have very good electrical properties.

The moulding compositions are particularly suitable for producing moulded parts where particularly high specifications with respect to heat resistance of the plastics used are required.

Another form of processing is to produce moulded items by thermoforming from previously prepared sheets or films.

The present invention also provides use of the moulding compositions according to the invention to produce moulded items of any type, preferably those mentioned above, and the moulded items produced from the moulding compositions according to the invention.

Examples

Component A

Linear polycarbonate based on bisphenol-A with a relative solution viscosity of 1.252, measured in $CH_2Cl_2$ as solvent at 25° C. in a concentration of 0.5 g/100 ml.

Component B

Graft polymer of 45 parts by weight of a copolymer of styrene and acrylonitrile in the ratio by weight of 72:28 on 55 parts by weight of particulate cross-linked polybutadiene rubber (average particle diameter $d_{50}$=0.4 µm), prepared by emulsion polymerisation.

Component C

Styrene/acrylonitrile copolymer with a styrene/acrylonitrile ratio by weight of 72:28 and an intrinsic viscosity of 0.55 dl/g (measured in dimethylformamide at 20° C.).

Component D

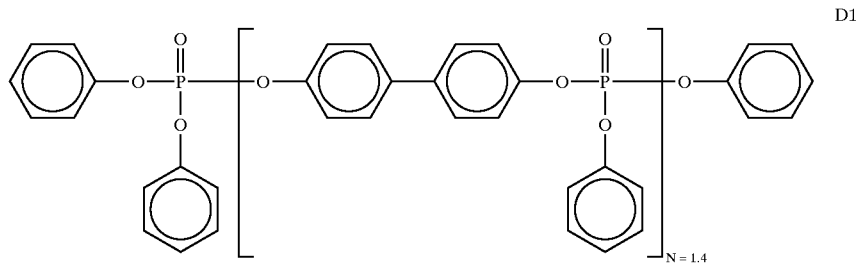

D1

D2 as comparison

Fyrolflex RDP® from the Akzo Co., based on m-phenylenebisdiphenyl phosphate.

Component E

Tetrafluoroethylene polymer as a coagulated mixture formed from an SAN graft polymer emulsion in accordance with component C in water and a tetrafluoroethylene polymer emulsion in water. The ratio by weight of graft polymer C to tetrafluoroethylene polymer E in the mixture is 90 wt. % to 10 wt. %. The tetrafluoroethylene polymer emulsion has a solids contents of 60 wt. %, the average particle diameter is between 0.05 and 0.5 µm. The SAN graft polymer emulsion has a solids content of 34 wt. % and an average latex particle diameter of 0.4 µm.

Preparation of E

The emulsion of the tetrafluoroethylene polymer (Teflon 30 N from Du Pont) is mixed with the emulsion of the SAN graft polymer C and stabilised with 1.8 wt. %, with respect to the polymer solids, of phenolic anti-oxidants. The mixture is coagulated at 85 to 95° C. using an aqueous solution of $MgSO_4$ (Epsom salts) and acetic acid at pH 4 to 5, filtered and washed until virtually free of electrolytes. Then the major proportion of water is removed by centrifuging and the product dried to a powder at 100° C. This powder can then be compounded with the other components in the equipment described.

Preparing and Testing Moulding Compositions According to the Invention

Components A to E are mixed on a 3 liter internal compounder. The moulded items are prepared in an injection moulding machine, type Arburg 270E, at 260° C.

The notched impact resistance is determined in accordance with the ISO 180 1A method using rods with the dimensions 80×10×4 mm$^3$ at room temperature.

The Vicat B softening point is determined in accordance with DIN 53 460.

The stress crack characteristics are tested using rods with the dimensions 80×10×4 mm$^3$ with a bulk temperature of 260° C. A mixture of 60 vol. % toluene and 40 vol. % isopropanol is used as the test medium. The specimens are pre-stretched using a template shaped in a circular arc and stored together for 5 or 10 minutes at room temperature in the test medium. The extent of pre-stretching $\delta_x$ is 0.2 to 2.4%. The stress crack characteristics are assessed by the production of cracks or fractures as a function of the degree of pre-stretching.

The composition of the materials tested and the data obtained are summarised in the following table.

TABLE 1

Composition and properties of polycarbonate/ABS moulding compositions

| Example | 1 Comparison | 2 | 3 |
|---|---|---|---|
| Components (parts by weight) | | | |
| A | 66.7 | 66.7 | 66.7 |
| B | 7.3 | 7.3 | 7.3 |
| C | 9.4 | 9.4 | 9.4 |
| D1 | — | 12.0 | 14.0 |
| D2 | 12.0 | — | — |
| E | 4.2 | 4.2 | 4.2 |
| Mould release agent | 0.4 | 0.4 | 0.4 |
| Properties: | | | |
| Vicat B$_{120}$ (° C.) | 94 | 115 | 112 |
| Notched impact resistance: (kJ/m$^2$) | 42 | 59 | 60 |
| ESC-behaviour | | | |
| 10 min/2.4% | | | no fracture |
| 5 min/2.4% | | BR 5:00 | |
| 5 min/1.6% | BR 5:00 | | |

It can be seen from the table that moulding compositions according to the invention have a very good combination of mechanical properties, in particular an improvement in stress crack resistance, notched impact resistance and heat resistance.

What is claimed is:
1. Flame-resistant thermoplastic moulding compositions containing
A 5 to 95 parts by weight of aromatic polycarbonate or polyester-carbonate
B 1 to 60 parts by weight of a graft polymer of
B.1 5 to 95 wt. % of one or more vinyl monomers on

B.2 5 to 95 wt. % of one or more graft substrates with a glass transition temperature below 10° C. and an average particle size (d$_{50}$ value) of 0.05 to 5 μm,
C 0 to 50 parts by weight of a thermoplastic vinyl (co)polymer,
D 0.5 to 20 parts by weight of a phosphorus compound of the general formula (I)

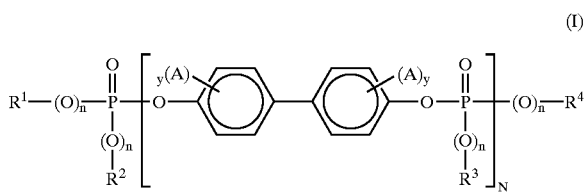

(I)

in which
A independently of each other, represents halogen or a C$_1$–C$_8$ alkyl, C$_6$–C$_{10}$ aryl, C$_7$–C$_{12}$ aralkyl group,
R$^1$, R$^2$, R$^3$ and R$^4$, independently of each other, represent an optionally halogenated C$_1$–C$_8$ alkyl group, or a C$_5$–C$_6$ cycloalkyl, C$_6$–C$_{20}$ aryl, or C$_7$–C$_{12}$ aralkyl group, each optionally substituted by halogen and/or a C$_1$–C$_4$ alkyl group,
y each, independently, is 0, 1, 2, 3 or 4,
n each, independently, is 0 or 1,
N is 0.3 to 30
and optionally one or more further phosphorus compounds of the formula (II)

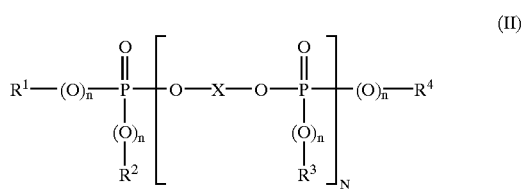

(II)

in which the groups R$^1$, R$^2$, R$^3$, R$^4$, n and N are defined as above and
X in formula (II) represents a mononuclear or polynuclear aromatic group with 6 to 30 carbon atoms with the exception of diphenyl,
E 0.05 to 5 parts by weight of a fluorinated polyolefin,
wherein the sum of the parts by weight of all the components in the moulding composition is 100.
2. Moulding compositions according to claim 1, wherein the phosphorus compounds of the formula (I) have an average N of 0.3 to 20.
3. Moulding compositions according to claim 1 wherein, in formula (I) or formula (II) R$^1$ to R$^4$, independently of each other, each represent a C$_1$–C$_4$ alkyl group or a C$_6$–C$_{10}$ aryl or C$_7$–C$_{12}$ aralkyl group each optionally substituted with halogen and/or an alkyl group and X is derived from aromatic diphenols, with the exception of diphenyl which aromatic diphenols may be optionally chlorinated, brominated and/or alkylated.
4. Moulding compositions according to claim 1 wherein the phosphorus compounds of the formula (I) and optionally (II) are a mixture of phosphorus compounds with average values for N of 0.5 to 10.
5. Moulding compositions according to claim 1 wherein fluorinated polyolefins E are polymers with fluorine content of 65 to 76 wt. %, average particle diameter d$_{50}$ of 0.08 to 20 μm and a density of 1.2 to 2.3 g/cm$^3$.

6. Moulding compositions according to claim 1, which contain 0.01 to 35 wt. %, with respect to the entire moulding composition, of at least one further flame-resistant agent.

7. Moulding compositions according to claim 1, containing 10 to 90 parts by weight of component A, 1 to 40 parts by weight of component B and 1 to 18 parts by weight of component D.

8. Moulding compositions according to claim 1, containing 20 to 80 parts by weight of component A, 2 to 30 parts by weight of component B and 2 to 15 parts by weight of component D.

9. Moulded items produced from moulding compositions according to claim 1.

10. A molding composition according to claim 1 wherein phosphorus compound of the formula (II) is at least one member selected from the group consisting of tributyl phosphate, tris-(2-chloroethyl) phosphate, tris-(2,3-dibromopropyl) phosphate, triphenyl phosphate, tricresyl phosphate, diphenylcresyl phosphate, diphenyloctyl phosphate, diphenyl-2-ethylcresyl phosphate, tri-(isopropylphenyl) phosphate, halogen-substituted aryl phosphates, dimethyl methylphosphonate, diphenyl methylphosphonate, diethyl phenylphosphonate, triphenylphosphine oxide and tricresylphosphine oxide.

11. The molding compositions of claim 1 wherein said B.2 is selected from the group consisting of diene rubber, acrylate rubber, silicone rubber and ethylene/propylene/diene rubber.

12. The molding composition of claim 1 further containing a very finely divided polar compound of at least one element from groups 1A to 5A or groups 1 B to 8 of the periodic system of elements with the at least one element selected from the group consisting of oxygen, sulfur, boron, carbon, phosphorus, nitrogen, hydrogen and silicon, said compound having an average particle diameter of less than 200 nm.

13. The molding composition according to claim 1 which further contains at least one additive selected from the group consisting of stabilizers, pigments, mould release agents, flow promoters, inorganic reinforcing materials, nanoparticles and anti-static agents.

* * * * *